Oct. 14, 1952 W. M. GOODALL 2,614,211

FREQUENCY CONTROLLED RADIO RELAYING SYSTEM

Filed May 13, 1950

INVENTOR
W. M. GOODALL
BY G. H. Stevenson
ATTORNEY

Patented Oct. 14, 1952 2,614,211

UNITED STATES PATENT OFFICE 2,614,211

FREQUENCY CONTROLLED RADIO RELAYING SYSTEM

William M. Goodall, Oakhurst, N. J., assignor to Bell Telephone Laboratories, Incorporated, New York, N. Y., a corporation of New York Application May 13, 1950, Serial No. 161,881

13 Claims. (Cl. 250—15)

Figure 1:
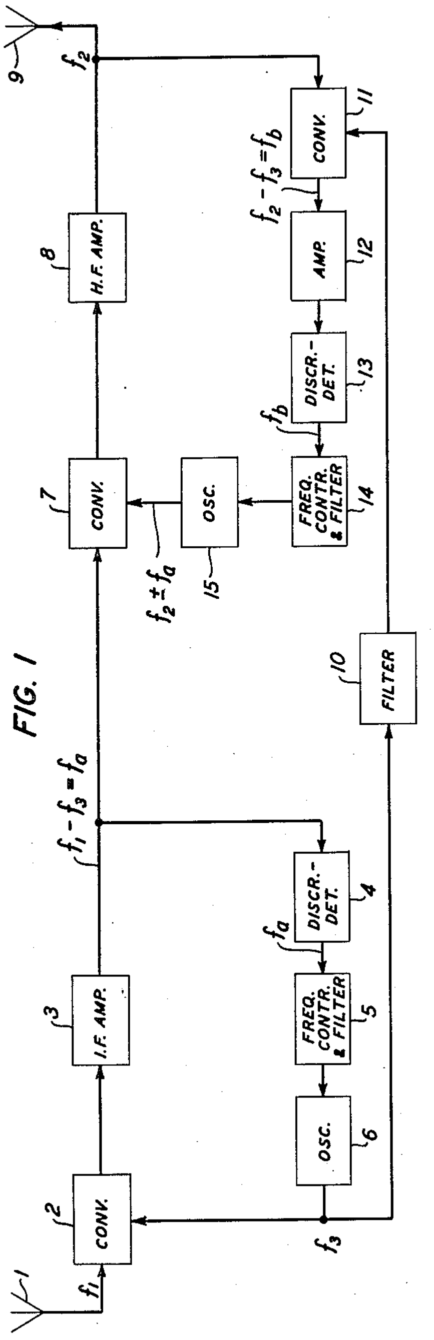

This invention relates to means for controlling the operating frequencies of the radio links in a radio repeater system, particularly a system adapted to utilize ultra-high frequency waves for relaying television or similar signals.

In a repeater system of this kind it is the usual practice first to heterodyne the received high frequency waves down to some lower frequency that is more suitable for amplification, since the amount of amplification needed is not readily obtainable with the types of ultra-high frequency amplifiers at present available. After amplification at the lower, or intermediate, frequency, a choice of two procedures is open: (1) the intermediate frequency waves may be heterodyned back to an ultra-high frequency level for retransmission, or (2) the intermediate frequency waves may be detected and the detected signal used to modulate a local ultra-high frequency transmitting oscillator. In either case it is desirable to have the outgoing waves differ in frequency from the incoming waves in order to avoid the possibility of feedback between the transmitting and receiving antennas. For proper operation of a chain of repeaters it is necessary to maintain the frequencies of the waves transmitted from each point at substantially constant values. To do this, it is necessary that the frequency difference between the received and outgoing waves be held constant. It is, of course, also desirable, and in fact necessary, to maintain the intermediate frequency constant so that it will always be in tune with the fixed-tuned input circuit of the intermediate frequency amplifier.

The object of the present invention, therefore, is to hold the aforesaid intermediate frequency constant and simultaneously to maintain a constant difference between the frequencies of the received and transmitted waves.

While the invention is particularly suitable for a frequency modulation system, it is equally applicable to amplitude modulation.

The invention comprises a heterodyne detector for converting the received waves to intermediate frequency waves, a heterodyne oscillator and a separate transmitting oscillator, control means including a discriminator-detector circuit responsive to variations of the intermediate frequency for regulating the frequency of the heterodyne oscillator so as to maintain the intermediate frequency at a constant value, and a second discriminator-detector type control circuit responsive jointly to variations of the frequencies of the heterodyne oscillations and the transmitted waves for regulating the frequency of the transmitting oscillator so as to maintain the desired constant difference between the frequencies of the received and the transmitted waves. When the first procedure mentioned above is followed, the output of the transmitting oscillator is heterodyned with the intermediate frequency waves, after the latter are amplified, to produce the transmitted waves; in the second procedure the amplified intermediate frequency waves are first detected, and the detected signal, after further amplification if necessary, is used to modulate the oscillations of the transmitting oscillator to produce the outgoing waves.

A particular feature of the invention lies in the fact that the control system depends primarily on the frequency characteristics of two discriminator-detector circuits, which can be made as stable as desired.

Figure 2:
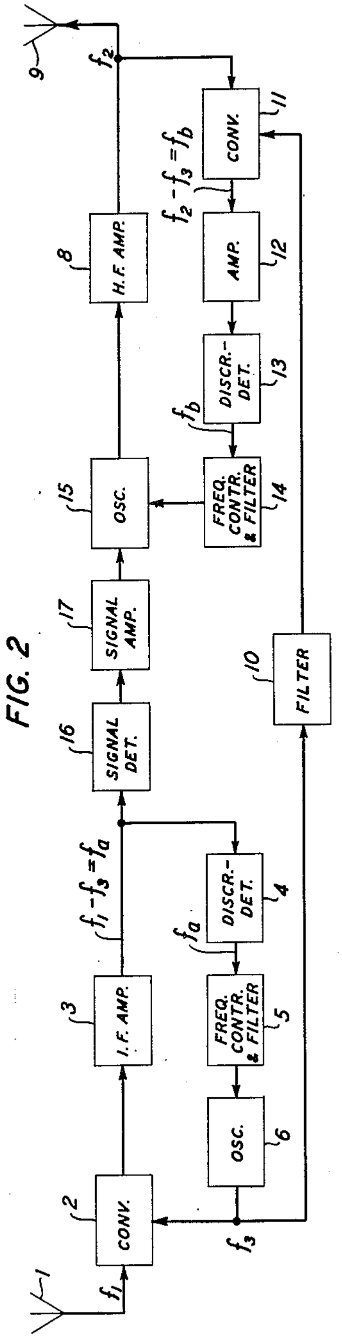

The invenion will be more clearly understood from the following detailed description together with the accompanying drawing in which:

Fig. 1 is a block diagram of a radio repeater station illustrating an application of the invention, and Fig. 2 is a modification of Fig. 1 also incorporating the invention.

Referring first to Fig. 1, there is shown a block diagram of a radio relay station for receiving signal modulated waves of one frequency and transmitting similarly modulated waves at a different frequency. The waves received at antenna 1, of frequency $f_1$, are fed to a converter 2 which is also supplied with heterodyning waves from oscillator 6 having a frequency $f_3$. The difference frequency $f_1-f_3$ is selected and amplified by intermediate frequency amplifier 3. A portion of the output of the amplifier is supplied to the balanced discriminator-detector circuit 4, which is tuned to a frequency $f_a$ equal to the desired intermediate frequency. When the intermediate frequency deviates from this value a direct-current voltage is generated by the detector portion of circuit 4, its polarity depending upon the direction of the deviation. This voltage is supplied to the control circuit 5 for regulating the frequency of oscillator 6 so that the intermediate frequency $f_1-f_3$ is held constant at the desired value $f_a$. This method of automatic frequency control is well known in the art and needs no detailed description. It is substantially the method disclosed in Patent No. 2,121,103 issued to S. W. Seeley, June 21, 1938.

Included in the frequency control circuit 5 but not separately shown is a low-pass filter which is needed if the received waves are frequency modulated but which may be omitted if they are amplitude modulated. This filter is designed to pass the slow voltage variations due to drifting of the mean frequency of the carrier and to suppress the more rapid voltage variations corresponding to the frequency modulation of the carrier by the transmitted signals, so that the latter will not affect the frequency control. The remaining portion of the output of the intermediate amplifier 3 is passed to a second converter 7 wherein it is combined with high frequency oscillations from oscillator 15 of frequency $f_2 \pm f_a$ to produce waves of the desired frequency $f_2$ for retransmission. The waves of this frequency, selected by a filter which may be a part of the converter 7, are amplified by the ultra-high frequency amplifier 8 and passed to the antenna 9.

Part of the output of amplifier 8 is supplied to converter 11 wherein it is combined with oscillations of frequency $f_3$ from oscillator 6 received through a filter 10 which is designed to pass a narrow band centered about $f_3$. The difference frequency $f_2 - f_3$ is selected from the combination products and may be amplified if necessary by amplifier 12. The output of this amplifier is then fed to the balanced discriminator-detector circuit 13 which is tuned to a frequency $f_b$ equal to the difference frequency $f_2 - f_3$ and which generates a control voltage proportional to the deviation of $f_2 - f_3$ from this value. The voltage thus generated is supplied to the control circuit 14 for controlling the frequency of oscillator 15. This control circuit may be of the same type as the frequency control circuit 5, with a filter designed to eliminate components of the desired signal frequencies.

The action of control 14 is to hold the difference frequency $f_2 - f_3$ equal to the value of $f_b$ defined by the discriminator-detector 13, and since oscillator 6 is already controlled to hold the difference $f_1 - f_3$ equal to $f_a$, the combined action of the two controls will hold the difference between $f_1$ and $f_2$ equal either to the difference or the sum of $f_a$ and $f_b$. The frequencies $f_a$ and $f_b$ defined by the discriminator-detectors 4 and 13 depend only on the constants of passive networks and may by suitable precautions in the design and construction be made as stable as may be desired. For the greatest precision they should preferably be of the balanced type.

The difference between the frequencies $f_1$ and $f_2$ is equal to the difference between $f_a$ and $f_b$ when both $f_1$ and $f_2$ are either greater or less than $f_3$. If one of these is greater and the other less than $f_3$, the frequency difference will be equal to the sum of $f_a$ and $f_b$.

In the case of frequency modulation, the frequencies $f_1$ and $f_2$ referred to are the center values of the modulated frequencies.

The circuit shown in Fig. 2 is a modification of that in Fig. 1. The main part of the circuit is the same as that of Fig. 1 and the same reference numbers are used to designate corresponding elements. In the modified circuit the signal modulated intermediate frequency waves are detected and the signal used to modulate the waves of a second high frequency oscillator, these being the waves that are transmitted.

Referring now to Fig. 2, a portion of the output of intermediate frequency amplifier 3 is delivered to discriminator-detector 4 and is used to control the frequency of oscillator 6, in the manner previously described. The remainder of the output of amplifier 3 goes to signal detector 16 which recovers the original signal frequency. This signal may be amplified, if desired, by amplifier 17 and is then applied to the transmitting oscillator 15, of frequency $f_2$, so as to modulate its output in accordance with the signal voltage. The output of oscillator 15 may then be further amplified by high frequency amplifier 8, after which it is delivered to antenna 9 for transmission.

The frequency of oscillator 15 is controlled in exactly the same manner as it was in the circuit of Fig. 1, but in this case its normal value is set at $f_2$ instead of $f_2 \pm f_a$. Under these conditions its frequency will follow any variations of $f_1$ just as in the case of Fig. 1. For example, if $f_1$ changes to $f_1 \pm \Delta f$, the corresponding change in $f_3$ will be $f_3 \pm \Delta f$. When this is combined with $f_2$ in converter 11 its output is now different from $f_2 - f_3$, or $f_b$, and produces a control voltage which operates frequency control 14. This changes the frequency of oscillator 15 and tends to bring it to the value $f_2 \pm \Delta f$.

It is to be understood that the above-described arrangements are illustrative of the application of the principles of the invention. Other arrangements may be devised by those skilled in the art without departing from the spirit and scope of the invention.

What is claimed is:

1. In a system for converting electrical waves of a first frequency to waves of a second frequency having a constant difference from said first high frequency, the combination of a source of waves of a third frequency, a source of waves of a fourth frequency, means for combining the waves of said first and third frequencies to produce a resultant frequency, means responsive to said resultant frequency for automatically regulating said third frequency so as to maintain said resultant frequency constant, means for combining the waves of said fourth and said resultant frequencies to produce said second frequency waves, and means responsive jointly to the waves of said second and third frequencies for regulating the said fourth frequency so as to maintain a constant difference between said first and second frequencies.

2. In a radio relay system, a first heterodyne converter for converting high frequency received waves to intermediate frequency waves, a first heterodyne oscillator associated with said converter to supply a heterodyning wave thereto, a first control device responsive to variations of the intermediate frequency for regulating the frequency of the said first oscillator so as to maintain the intermediate frequency at a constant value, an amplifier for said intermediate frequency waves, a second heterodyne converter for converting said intermediate frequency waves from said amplifier to high frequency waves for transmission, a second heterodyne oscillator associated with said second converter to supply a heterodyning wave thereto, and a second control device responsive jointly to variations of the frequencies of the said first heterodyne oscillator and the waves for transmission for regulating the frequency of the said second heterodyne oscillator so as to maintain a constant difference between the frequencies of the received waves and the waves for transmission.

3. In a frequency conversion system for converting received signal modulated waves of a first high frequency to similarly modulated waves of a second high frequency, the combination of a first oscillator for generating waves of a third high frequency, a first converter for combining the waves of said first and third freqeuncies to produce waves of an intermediate frequency, a first control device responsive to variations of the intermediate frequency for regulating the said third high frequency so as to maintain said intermediate frequency constant, a second oscillator for generating waves of a fourth high frequency, said fourth frequency being equal to the sum of the said intermediate and second frequencies, a second converter for combining the waves of said intermediate and fourth frequencies and for selecting from the combination products the said second frequency, said last-mentioned frequency being equal to the difference between said combining frequencies, and a second control device responsive to variations of the difference between the said second and third frequencies for regulating the said fourth frequency so as to maintain said difference constant.

4. In a frequency conversion system for converting received signal modulated waves of a first high frequency to similarly modulated waves of a second high frequency, the combination of a first oscillator for generating waves of a third high frequency, a first converter for combining the waves of said first and third frequencies to produce waves of an intermediate frequency, a first control device responsive to variations of the intermediate frequency for regulating the said third high frequency so as to maintain said intermediate frequency constant, a second oscillator for generating waves of a fourth high frequency, said fourth frequency being equal to the difference between the said second and intermediate frequencies, a second converter for combining the waves of said intermediate and fourth frequencies and for selecting from the combination products the said second frequency, said second frequency being equal to the sum of said combining frequencies, and a second control device responsive to variations of the difference between the said second and third frequencies for regulating the said fourth frequency so as to maintain said difference constant.

5. A radio relay system comprising an antenna for receiving high frequency signal modulated waves to be relayed, a first local generator of high frequency oscillations, a first converter to which waves from said generator and received waves are fed and heterodyned together to produce a first intermediate frequency wave, an amplifier for amplifying said first intermediate frequency wave, a first discriminator-detector apparatus tuned to said intermediate frequency and coupled to the output of said amplifier, a first frequency control device for utilizing the output of said apparatus to regulate the frequency of the wave derived from said first local generator, so as to maintain said intermediate frequency constant, a second local generator of high frequency oscillations, a second converter to which waves from said intermediate frequency amplifier and said second generator are fed and heterodyned together to produce a high frequency output wave, a third converter to which said high frequency output wave and said first generator wave are fed to produce a second intermediate frequency wave, a second discriminator-detector apparatus tuned to said second intermediate frequency and coupled to the output of said third converter, a second frequency control device for utilizing the output of said second discriminator-detector apparatus to regulate the frequency of the wave derived from said second local generator so as to maintain a constant difference between the frequencies of the received wave and the high frequency output wave of said second converter, and a second antenna for transmitting said last-mentioned wave.

6. The combination specified in claim 5 wherein the said first and second high frequency control devices each includes a filter which eliminates voltage components that may be due to frequency modulation of the received waves but which passes components due to frequency drift of said waves.

7. In combination, a source of signal modulated high frequency waves, means including a first oscillation generator for heterodyning said waves to an intermediate frequency, means responsive to variations of said intermediate frequency waves for automatically frequency controlling said oscillation generator so as to maintain said intermediate frequency at a constant value, a signal detector for recovering the modulating signal from said intermediate frequency waves, a second oscillation generator coupled to said signal detector so as to have its oscillations modulated by the detected signal, and means responsive jointly to variations of the frequencies of the said first and second oscillation generators for automatically frequency controlling said second generator so as to maintain a constant difference between its frequency and that of said source.

8. In a frequency conversion system, for converting received signal modulated waves of a first high frequency to similarly modulated waves of a second high frequency having a constant difference from said first high frequency, the combination of an oscillator for generating waves of a third high frequency, a first converter for combining the waves from said oscillator and the signal modulated waves to produce waves of an intermediate frequency, a first control device responsive to variations of the intermediate frequency for automatically regulating the frequency of said oscillator so as to maintain said intermediate frequency constant, an amplifier for said intermediate frequency waves, a signal detector coupled to said amplifier, a second oscillator for generating waves of said second high frequency connected to said detector so as to have its oscillations modulated by the detected signal waves, and a second control device responsive jointly to variations of the frequencies of said second and said first oscillators for regulating the said second oscillator so as to maintain a constant difference between said first and second frequencies.

9. In a radio relay system a first heterodyne detector for converting signal modulated high frequency received waves to intermediate frequency waves, a heterodyne oscillator for supplying a heterodyning wave to said detector, a first control device responsive to variations of the intermediate frequency for regulating the frequency of the said heterodyne oscillator so as to maintain the intermediate frequency at a constant value, an amplifier for amplifying said intermediate frequency waves, a signal detector for recovering the modulating signal from the output of said amplifier, an oscillation generator connected to said signal detector so as to have its oscillations modulated by the detected signal waves, and a second control device responsive jointly to variations of the frequencies of the said heterodyne oscillator and said oscillation generator for automatically frequency controlling said oscillation generator so as to maintain a constant difference between its frequency and that of the received waves.

10. A radio relay system comprising an antenna for receiving signal modulated waves to be relayed, a first local generator of oscillations, a converter to which received waves and waves from said generator are fed and heterodyned together to produce an intermediate frequency wave, a first amplifier for amplifying said intermediate frequency wave, a first discriminator-detector apparatus coupled to the output of said amplifier, a first high frequency control device for utilizing the output of said apparatus to regulate the frequency of the wave derived from said local generator, a signal detector coupled to the output of said amplifier, a second local generator of oscillations coupled to said signal detector so as to have its oscillations modulated by the detected signal waves, a second converter to which are fed waves from said first and second local generators to produce a second intermediate frequency wave, a second discriminator-detector apparatus coupled to the output of said second converter, a second frequency control device for utilizing the output of said second discriminator-detector apparatus to regulate the frequency of said second local generator, and a second antenna coupled to the last-mentioned generator for transmitting waves generated by same.

11. The combination specified in claim 10 wherein the said first and second high frequency control devices each includes a filter which eliminates voltage components that may be due to frequency modulation of the received waves but which passes components due to frequency drift of said waves.

12. In combination, a source of signal modulated high frequency waves, means including a first oscillation generator for heterodyning said waves to waves of an intermediate frequency, an automatic frequency control circuit for said first oscillation generator responsive to said intermediate frequency waves from said heterodyning means for varying the frequency of said oscillation generator to maintain said intermediate frequency constant, means including a second oscillation generator for producing from said intermediate frequency waves a second high frequency wave for transmission modulated by the same signal as said intermediate frequency wave, and a control circuit for said second oscillator generator responsive jointly to variations in the frequency of said waves for transmission and of said first oscillation generator to maintain a constant frequency difference between the waves of said source and said waves for transmission.

13. In a radio relay system, a heterodyne detector for converting received radio waves to intermediate frequency waves, an oscillator for supplying a heterodyning wave to said converter, a separate transmitting oscillator, a converter for combining the output of said transmitting oscillator and said intermediate frequency waves to produce a wave for transmission, control means responsive to frequency variations of the intermediate frequency waves for regulating the frequency of the heterodyne oscillator so as to maintain the intermediate frequency at a constant value, and a second control means responsive jointly to variations of the frequencies of the heterodyne oscillations and the waves for transmission for regulating the frequency of the transmitting oscillator so as to maintain a constant difference between the frequencies of the received and the transmitted waves.

WILLIAM M. GOODALL.

REFERENCES CITED

The following references are of record in the file of this patent:

UNITED STATES PATENTS

| Number | Name | Date |
|---|---|---|
| 2,270,023 | Ramsay et al. | Jan. 13, 1942 |
| 2,287,044 | Kroger | June 23, 1942 |
| 2,344,813 | Goldstine | Mar. 21, 1944 |
| 2,405,765 | Smith | Aug. 13, 1946 |
| 2,407,212 | Tunick | Sept. 3, 1946 |
| 2,407,213 | Tunick | Sept. 3, 1946 |
| 2,425,013 | Stoltz | Aug. 5, 1947 |
| 2,434,293 | Stearns | Jan. 13, 1948 |
| 2,501,368 | White | Mar. 21, 1950 |
| 2,516,009 | Mack et al. | July 18, 1950 |